(12) United States Patent
Pelin et al.

(10) Patent No.: US 11,347,222 B2
(45) Date of Patent: May 31, 2022

(54) SYSTEM AND METHOD FOR AUTOMATICALLY NAVIGATING A CHARTED CONTOUR

(71) Applicants: Per Pelin, Torslanda (SE); Paul D. Salmon, Mankato, MN (US)

(72) Inventors: Per Pelin, Torslanda (SE); Paul D. Salmon, Mankato, MN (US)

(73) Assignee: Johnson Outdoors Inc., Racine, WI (US)

( * ) Notice: Subject to any disclaimer, the term of this patent is extended or adjusted under 35 U.S.C. 154(b) by 387 days.

(21) Appl. No.: 15/795,013

(22) Filed: Oct. 26, 2017

(65) Prior Publication Data

US 2018/0129213 A1 May 10, 2018

Related U.S. Application Data

(60) Provisional application No. 62/420,871, filed on Nov. 11, 2016, provisional application No. 62/419,839, filed on Nov. 9, 2016.

(51) Int. Cl.
| | |
|---|---|
| G05D 1/02 | (2020.01) |
| G01C 21/20 | (2006.01) |
| B63J 99/00 | (2009.01) |
| B63H 20/00 | (2006.01) |
| G01S 7/62 | (2006.01) |
| G01S 15/89 | (2006.01) |
| G01C 13/00 | (2006.01) |
| B63B 49/00 | (2006.01) |

(52) U.S. Cl.
CPC ............ *G05D 1/0206* (2013.01); *B63B 49/00* (2013.01); *B63H 20/007* (2013.01); *B63J 99/00* (2013.01); *G01C 13/008* (2013.01); *G01C 21/203* (2013.01); *G01S 7/6263* (2013.01); *G01S 15/8902* (2013.01); *B63B 2201/18* (2013.01); *B63B 2213/02* (2013.01)

(58) Field of Classification Search
CPC .......................... G05D 1/0206; G01S 15/8902
See application file for complete search history.

(56) References Cited

U.S. PATENT DOCUMENTS

| | | |
|---|---|---|
| 7,652,952 B2 | 1/2010 | Betts et al. |
| 7,710,825 B2 | 5/2010 | Betts et al. |

(Continued)

*Primary Examiner* — Navid Z. Mehdizadeh
(74) *Attorney, Agent, or Firm* — Reinhart Boerner Van Deuren P.C.

(57) ABSTRACT

A system for controlling a marine vessel has a sonar depth finder which displays a chart, stored in memory, for a body of water. The chart includes an underwater feature contour that defines a boundary of an underwater feature. The sonar depth finder includes a processor to create or update the topographical chart based on sonar data from a sonar transducer assembly. The sonar data includes information on the underwater feature. The processor can display and store the topographical chart. The user may select from the underwater feature contours on the depth finder display. The depth finder can generate a route for the marine vessel that includes a path along the selected underwater feature contours. A vessel control device, in communication with the depth finder, may receive transmissions, from the depth finder, which include the generated route. The vessel control device can automatically direct the marine vessel along the route.

20 Claims, 9 Drawing Sheets

(56) References Cited

U.S. PATENT DOCUMENTS

| | | |
|---|---|---|
| 7,729,203 B2 | 6/2010 | Betts et al. |
| 7,755,974 B2 | 7/2010 | Betts et al. |
| 8,082,100 B2 | 12/2011 | Grace et al. |
| 2012/0015566 A1 | 1/2012 | Salmon |
| 2012/0232719 A1* | 9/2012 | Salmon ................ G05D 1/0206 |
| | | 701/2 |
| 2013/0215719 A1 | 8/2013 | Betts et al. |
| 2014/0032479 A1* | 1/2014 | Lauenstein ............. G01B 5/18 |
| | | 707/602 |
| 2014/0269164 A1 | 9/2014 | Betts et al. |
| 2015/0285909 A1* | 10/2015 | Pelin .................... G01S 7/6263 |
| | | 702/5 |
| 2016/0306040 A1* | 10/2016 | Hunt .................... G01S 7/6272 |
| 2016/0311511 A1* | 10/2016 | Clark ...................... B63B 79/40 |

* cited by examiner

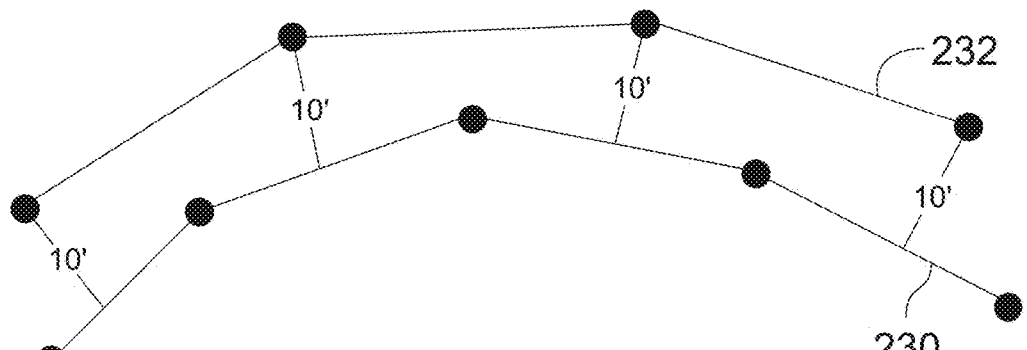
FIG. 9
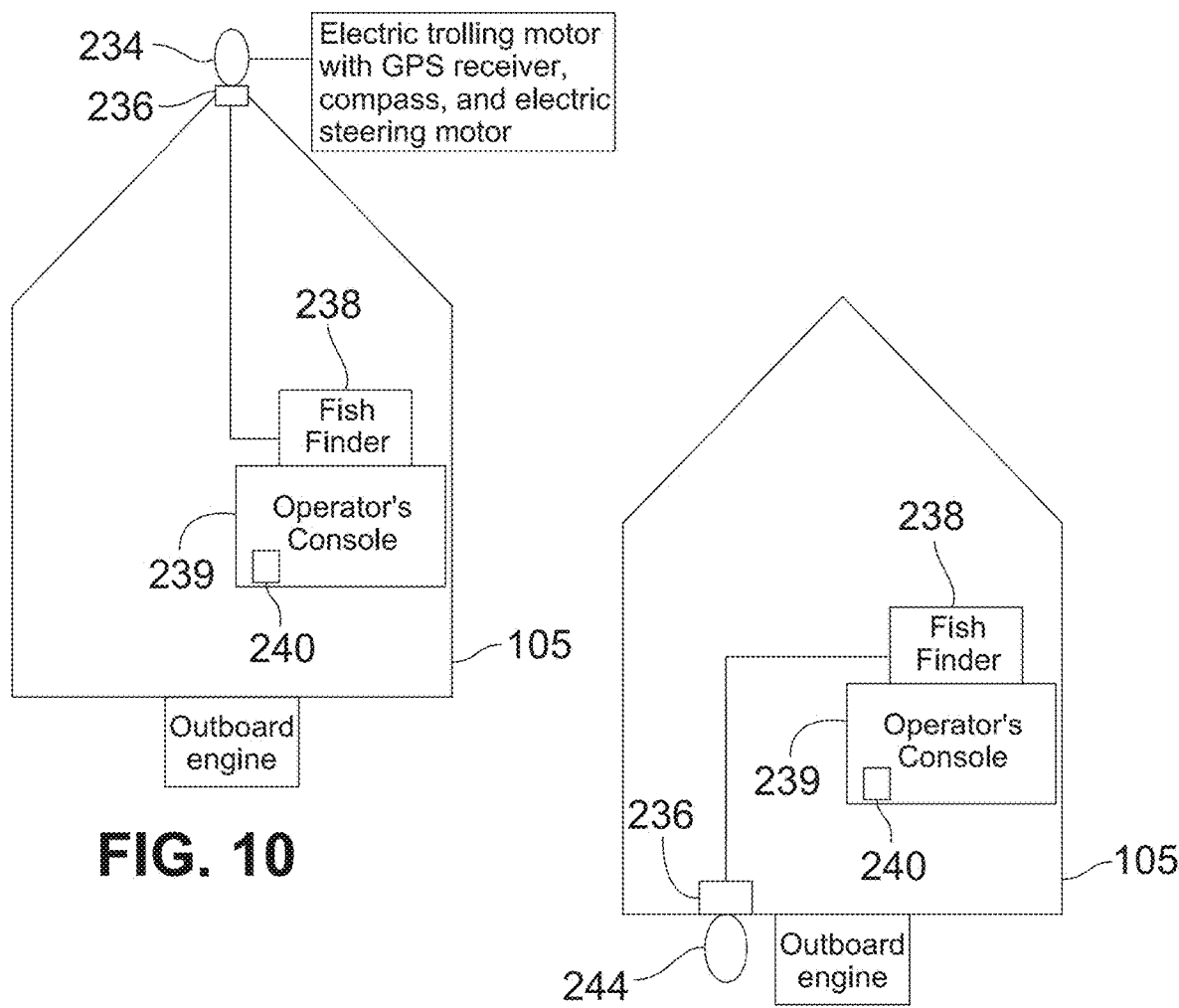
FIG. 10
FIG. 11

SYSTEM AND METHOD FOR AUTOMATICALLY NAVIGATING A CHARTED CONTOUR

CROSS-REFERENCE TO RELATED PATENT APPLICATIONS

This patent application claims the benefit of U.S. Provisional Patent Application No. 62/419,839, filed Nov. 9, 2016, and U.S. Provisional Patent Application No. 62/420,871, filed Nov. 11, 2016, the entire teachings and disclosure of which are incorporated herein by reference thereto.

FIELD OF THE INVENTION

This invention generally relates to a system and method for marine navigation.

BACKGROUND OF THE INVENTION

Sonar transducer assemblies are sometimes mounted on the hulls of watercrafts for various purposes, fish finding for example. U.S. Patent Publication No. 2013/0215719, published on Aug. 22, 2013, discloses a system including a sonar transducer assembly, deployed below the bottom of a boat hull, which provides 360-degree sonar imaging, the entire teachings and disclosure of which is incorporated herein by reference thereto. U.S. Patent Publication No. 2014/0269164, published Sep. 18, 2014, discloses a system including a sonar transducer assembly, which provides sonar imaging for a predetermined sector, the entire teachings and disclosure of which is incorporated herein by reference thereto. Various embodiments of a system for sonar imaging is disclosed in the following patents: U.S. Pat. No. 7,652,952 issued on Jan. 26, 2010 to Betts et al.; U.S. Pat. No. 7,710,825 issued on May 4, 2010 to Betts et al.; U.S. Pat. No. 7,729,203 issued on Jun. 1, 2010 to Betts et al.; and U.S. Pat. No. 7,755,974 issued on Jul. 13, 2010 to Betts et al., the entire teachings and disclosures of which are incorporated herein by reference thereto.

It is often advantageous for anglers to have detailed maps or charts of the lakes, rivers, or other bodies of water in which they fish. Charts showing the topography of the lake bed, river bed, or sea bed, and the underwater features thereof, may inform the angler as to the best location for catching a particular type of fish. Embodiments of the present invention advance the state of the art with respect to the use of sonar imaging and navigation systems on watercrafts in a way that addresses some of the aforementioned needs of anglers.

Because waterways and the underwater features of these waterways change, and because the methods of creating the cartography is becoming more exact, paper charts are quickly becoming obsolete. Most marine navigation systems now include built-in electronic cartography. This cartography feature is either embedded in the memory of the system or is available on a portable media format (e.g., memory card, CD, etc.). Once the navigation system knows the vessel's present location and has electronic cartography available, it is able to show the present location of the vessel on the system's displayed map. This allows the vessel operator to use the navigation system to guide the vessel to a desired destination.

Some versions of electronic cartography also include water depth information. Here, in certain systems, the water depth may be associated with the actual coordinates that make up the chart. Instead of the chart showing the water depth for every available coordinate on the map, the charts may use what are known as depth contour or bottom contour lines. These lines are shown periodically in depth increments, such as every 1 foot or every 10 feet or every 100 feet, depending on the actual contour of the bottom and the accuracy of the measurement methods used when creating the cartography. These depth contour lines will follow the depth associated with the line so as the waterway bottom comes up or down these lines will shift accordingly.

Vessel navigation has evolved from its earlier days in locating the vessel upon a body of water and displaying that location information for a vessel operator to an ability to create user programmed routes to guide the vessel. Conventional navigation systems may allow users to manually create a series of turn points and then connect them together to create a contiguous path for the vessel to follow. Unfortunately, disadvantages exist with conventional navigation systems. As an example, one disadvantage is that it is cumbersome and, depending on the detail provided by the underlying chart, may not be truly accurate. Additionally, a certain amount of time is generally required to create the turn points necessary to generate a desired route, making it difficult to generate such a route while the vessel is underway.

In conventional navigation systems, the charts, codes, programs and systems typically have limited resources available for processing and converting complex chart and depth contour information. For example, a fishing vessel may be in the vicinity of a desirable underwater feature, or at a desirable depth for fishing, but will typically traverse among various features and depths due to an inability of the navigation system to keep the vessel on a course in which the vessel's position tracks along the aforementioned desirable features or depths.

As such, there exists a need for a system which can automatically create a navigable route along a specific underwater feature or depth contour line depicted on a navigational system display. Embodiments of the invention provide such a system. These and other advantages of the invention, as well as additional inventive features, will be apparent from the description of the invention provided herein.

BRIEF SUMMARY OF THE INVENTION

With respect to embodiments of the present invention, techniques for digital mapping are provided. In particular, an embodiment of the present invention provides methods, devices, codes, and systems for displaying selected regions of a body of water and associated areas. More particularly, the present invention provides systems, methods, codes, and devices for selectively highlighting one or part of one depth contour or underwater feature contour in the chart of a body of water using a display coupled to a navigation system (i.e., global position system or sensor) or other visual Display Device. Of course, other embodiments may be provided as well.

In one aspect, embodiments of the invention provide a system for controlling a marine vessel. The system includes a sonar depth finder configured to display a chart for a body of water. The chart has depth information for the body of water, and is programmed to allow a user to select from a plurality of depths indicated on the sonar depth finder display, or from a plurality of underwater feature contours on the depth finder display. The sonar depth finder further is configured to generate a route for the marine vessel. The route includes a path through the body of water where each point along the path is at the desired depth, or where each point along the path is around or along the designated underwater feature. The system includes a vessel control device in communication with the sonar depth finder. The vessel control device is configured to receive transmissions from the sonar depth finder. These transmissions include the route generated by the sonar depth finder. The vessel control device is further configured to automatically direct the marine vessel along the route.

In another aspect, embodiments of the invention provide a system for controlling a marine vessel. The system includes a sonar depth finder configured to display a chart for a body of water. The chart includes depth or underwater feature information for the body of water. The sonar depth finder is programmed to allow a user to input a desired depth or to input location information for an underwater feature, and the sonar depth finder is configured to generate one or more routes for the marine vessel. The route includes a path through the body of water such that at each point along the path, the water is at the desired depth, or where each point along the path is around or along the designated underwater feature. The system also includes a vessel control device in communication with the sonar depth finder. The vessel control device is configured to receive transmissions from the sonar depth finder. These transmissions include the route generated by the sonar depth finder. The vessel control device is further configured to automatically direct the marine vessel along the route.

According to embodiments of the present invention, techniques for digital mapping are provided. In particular, embodiments of the present invention provide methods, codes, devices, and systems for displaying selected regions of a body of water and associated areas. More particularly, embodiments of the present invention provide systems, methods, codes, and devices for selectively highlighting one or part of one depth contour or underwater feature contour in the chart of a body of water using a display coupled to a navigation system or other visual display device. The selected depth contour, underwater feature contour, or part thereof to then be converted into a machine-readable code and outputted, as one or more indications associated with the contour lines on the display, in machine-readable code to a vessel control device.

As an example, ProMap Technologies, Inc., d/b/a LakeMaster Lake Maps has developed a Chart Library and Application Programming Interface (API) that allows navigation system manufacturers to embed the API into their OS and thus display proprietary LakeMaster Digital Charts. These LakeMaster Digital Charts reside on a secure SD media card in a format initially compatible with certain navigation system display devices currently available. Typically navigation system displays are configured to display charts and maps in multiple colors, and may display GPS coordinates, including latitude and longitude for selected points on the display. By connecting the navigation system to a vessel control device, the vessel can automatically be directed along selected depth contour lines or underwater feature contour lines without the necessity of creating independent routing information for the vessel control device. Of course, one or ordinary skill in the art would recognize other variations, modifications, and alternatives.

Conventional route generation typically involves creating a route from a first starting point to an end point. Between these points, routes are created. Typically, however, these routes do not traverse along a particular contour, which is often desirable for vessel navigation or fishing techniques.

In a specific embodiment, the present method and system provides a way of navigating along a portion of a contour, which has no end points.

In a specific embodiment, the present method and system overcomes one or more of the limitations described above by providing for a rapid, easily applied automatic way of creating a navigable route from complex depth contour line or underwater feature contour line in a language understandable by and for transmission to various vessel control devices, which are configured to navigate the vessel.

For example, using a Chart Library and API that allows navigation system manufacturers to embed the API into their respective operating systems, the manufacturers can display proprietary LakeMaster Digital Charts containing detailed depth or underwater feature contours for a body of water. The cartographic data is included in a Chart Library which is encoded to allow the user to select and automatically convert a depth contour, underwater feature contour, or part thereof, into a route in machine-readable code that can be used by an autopilot device or direct vessel control device configured for use on commercial and recreational marine vessels, for example.

In a specific embodiment, the present invention provides a method for selecting one or more depth contour lines or underwater feature contours for a body of water, such as a lake, river, bay, or stream, from a digital or raster map of the depth or underwater feature contours displayed on a navigation system display or similar type of display device, and converting that map information into machine-readable code to allow a vessel control device, such as a trolling motor controller with autopilot features, to navigate a vessel along the one or more selected depth or underwater feature contours. Such a trolling motor control device is disclosed in U.S. Patent Publication No. 2012/0015566, entitled "System and Method for Controlling a Trolling Motor", whose teachings and disclosure are incorporated in their entirety herein by reference thereto. The aforementioned method includes providing at least one chart out of a plurality of charts of one or more regions of a body of water. In a specific embodiment, the chart comprises a depiction of a plurality of depth contour lines of constant depth below the surface, a plurality of underwater feature contours, or of other defined contiguous regions of the one or more regions of the body of water.

Preferably, the chart is configured to allow selection of one or more such contour lines by a user. The method also includes selecting at least one contour or part of a contour to be highlighted simultaneously with the chart on the display and processing information associated with the selected contour with information from the chart to convert one or more lines to machine readable code. The method includes outputting one or more indications associated with the one or more contour lines on the display in machine-readable code to a vessel control device. Optionally, the outputting of the one or more indications is provided simultaneously with the chart to display the one or more indications with the chart together.

In a particular embodiment, the method has various indications. That is, one or more indications are associated with one or more broken contour lines, one or more flashing contour lines, one or more series of symbols, or other visual indications for a display. In a specific embodiment, the one or more indications are associated with one or more contour lines differentiated from the remaining contour lines or wherein the one or more indications are associated with one or more shaded regions differentiated from the remaining regions, or wherein the one or more indications are associated with one or more colored regions differentiated from the remaining regions.

In other embodiments, the method includes a chart, which is displayed and can also be stored in computer memory in computer-readable form. In a specific embodiment, the chart comprises information associated with the plurality of depth contour lines or a plurality of underwater feature contours. In a specific embodiment, the chart is one of a multiple or a plurality of charts provided in a library, which is stored on a media card. In a preferred embodiment, the plurality of charts being in respective raster forms, but can be other combinations. In a specific embodiment, the chart comprises information associated with the plurality of depth contour lines, or the plurality of underwater feature contours. In a specific embodiment, the chart is from a plurality of charts provided in a library stored on a media card. In a particular embodiment, the plurality of charts is in respective vector forms. In a more specific embodiment, the chart includes an indication which represents a change in composition of the bottom surface for a body of water. In other embodiments, the chart includes a structure indication representative of, for example, an edge of a weed bed and/or vegetation bed, sandbar, shoal, reef, or varying degrees of hardness on a bottom surface of the body of water.

In one or more embodiments, the method includes optional techniques for inputting either depth or underwater feature information. In a specific embodiment, the method includes selecting a particular depth or underwater feature contour, and further includes inputting the depth or underwater feature information through a user interface provided on the navigation system or other display device. In certain embodiments, the method also includes moving a slide bar on a user interface provided on the navigation system or other display device to initiate input of the depth or underwater feature information. In alternate embodiments, the depth information can also be provided via a key pad or toggle switch on the navigation system or other display device. In further embodiments, the method includes selecting and highlighting a depth or underwater feature contour on the navigation system display or other display device, inputting the depth or underwater feature information through a user interface to allow one or more voice commands, or inputting the depth or underwater feature information through a user interface provided through a key pad or toggle that is separate from the navigation system display or other display device. Of course, there can be other variations, modifications, and alternatives.

In an alternative specific embodiment, the present method includes selecting a depth or underwater feature contour, which is automatically navigated by a marine vessel. The step of selecting includes inputting a command through a preset user menu interface provided on the navigation system or other display device. Inputting the command may be done by one of moving a slide bar on a user interface provided on the navigation system or other display device, using a key pad or toggle on the navigation system or other display device, inputting the desired depth or underwater feature contour by selecting and highlighting the depth or underwater feature contour on the navigation system or other display device, inputting the depth or underwater feature contour via voice commands through a user interface that recognizes such voice commands, and inputting the depth or underwater feature contour through a user interface provided on a key pad or toggle switch, for example, that is separate from the navigation system or other display device.

Still further, embodiments of the present invention include a method that calls for selecting an underwater feature contour, such as a weed bed edge contour, a vegetation field contour, a reef contour, a sandbar contour, a shoal contour, or a contour between varying degrees of bottom surface hardness under the body of water, where any of these contours can be navigated by a waterborne vessel. The method further includes inputting the command through a preset user menu interface provided on the navigation system or other display device. Inputting the command may be done by one of moving a slide bar on a user interface provided on the navigation system or other display device, using a key pad or toggle on the navigation system display or other display device, inputting the desired underwater feature contour by selecting and highlighting the underwater feature contour on the navigation system or other display device, inputting the underwater feature contour via voice command through a user interface that recognizes such voice commands, and inputting the underwater feature contour through a user interface provided through a key pad or toggle switch, for example, that is separate from the navigation system display or other display device.

In still another aspect, embodiments of the invention provide a system for controlling a marine vessel. The system has a sonar depth finder configured to display a chart, stored in memory, for a body of water. The chart includes one or more underwater feature contours that define boundaries of an underwater feature in the body of water. The sonar depth finder includes a processor configured to create the topographical chart in real time, or to update the topographical chart in real time, based on sonar data provided by a sonar transducer assembly. The sonar data includes information on the underwater feature. The processor is configured to render the created or updated topographical chart on the display and to store the topographical chart in memory. The sonar depth finder is programmed to allow a user to select from the one or more underwater feature contours indicated on the sonar depth finder display. The sonar depth finder is further configured to generate a route for the marine vessel. The route includes a path through the body of water. The path is along the selected one or more underwater feature contours. A vessel control device is in communication with the sonar depth finder. The vessel control device is configured to receive transmissions from the sonar depth finder. The transmissions include the route generated by the sonar depth finder. The vessel control device is further configured to automatically direct the marine vessel along the route.

In a particular embodiment, the underwater feature is one of a weed and/or vegetation bed and/or a sandbar, reef, shoal, or varying degrees of bottom hardness located under the body of water. The underwater feature may include one or more colors superimposed on the display of the chart for the body of water, and wherein each color represents a different underwater feature. Further, the one or more underwater feature contours shown on the sonar depth finder display may indicate an edge or perimeter of the underwater feature.

In certain embodiments, the sonar depth finder is configured to allow a user to select two or more underwater feature contours, and wherein the route generated by the sonar depth finder includes at least a portion of each of the two or more underwater feature contours. The sonar depth finder may be configured to permit a user to select a portion of one of the one or more underwater feature contours from which selection the sonar depth finder generates the route for transmission to the vessel control device. In a more particular embodiment, the sonar depth finder is configured to permit the user to add track points between two selected portions from the one or more underwater feature contours from which the sonar depth finder generates the route for transmission to the vessel control device, the route including both selected portions and the added track points.

In a further embodiment, the sonar depth finder is configured to permit a user to select one of the one or more underwater feature contours and a direction of travel from which selection the sonar depth finder generates the route for transmission to the vessel control device. Further, the sonar depth finder may be configured to permit the user to select an offset from the selected underwater feature contour, and to generate a route, based on the chosen offset, for transmission to the vessel control device.

The vessel control device may include a controller for a trolling motor, the controller comprising a GPS receiver, a compass, a communications module, and means for rotating the trolling motor. Also, the controller is configured to store date for the entire route generated by the sonar depth finder and to control the trolling motor such that the marine vessel automatically follows the route. In a particular embodiment, the controller is configured to store date for only a portion of the route, and wherein the controller is configured to periodically receive data from the sonar depth finder regarding the portion of the route the marine vessel is about to navigate.

The sonar depth finder may be configured to allow a user to input a location for the underwater feature, the sonar depth finder further configured to generate one or more routes for the marine vessel, wherein each of the one or more routes includes a path along an underwater feature contour for the underwater feature. In some embodiments, the vessel control device is in wireless communication with the sonar depth finder.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 9 is a diagram of a depth contour line along with a laterally-shifted contour line, in accordance with an embodiment of the invention;

FIG. 10 is a diagram of a marine vessel with sonar depth finder/fish finder, bow-mounted trolling motor and trolling motor controller, according to an embodiment of the invention; and FIG. 11 is a diagram of a marine vessel with sonar depth finder/fish finder, transom-mounted trolling motor and trolling motor controller, according to an embodiment of the invention.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
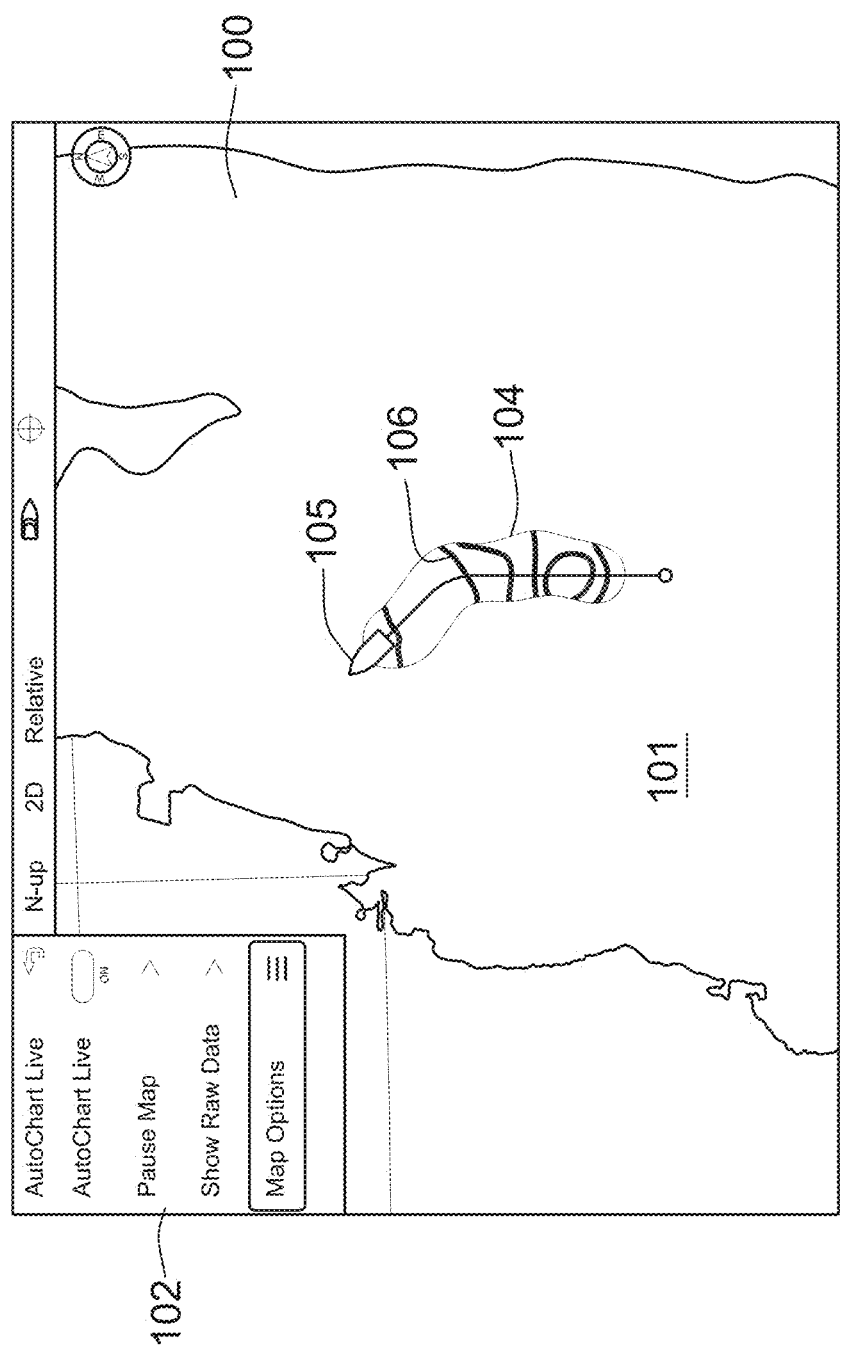
FIG. 1 is an exemplary screenshot of the display for the sonar mapping system, in accordance with an embodiment of the invention.

FIG. 1 shows an exemplary illustration of a chart 100 showing a boat 105 location on a chart 100 displayed for the user. The display may be that of a sonar imaging fish finder, for example. The chart 100 may be one that is stored in the fish finder memory, or as explained below, one that is generated via an automatic mapping function initiated using a sonar mapping system 200 (shown in FIG. 4). In a particular embodiment, the sonar mapping system 200 is configured to access the chart 100 in memory (not shown). Thus, the user may access, in memory, a desired chart for a body of water 101, for example the body of water on which the user is navigating. When the automatic charting function is operating, a control processor 208 (shown in FIG. 4) is configured to update the chart 100 with topographical data 104 in real time based on sonar data provided by a sonar transducer assembly, which could be mounted on the hull of the boat 105 such that the sonar beam from the transducer assembly could be directed below, forward, behind, or the either side of the boat 105. The control processor 208 is also configured to render the updated chart 100 on the display. The embodiments of FIG. 1 shows an example of topographical data 104 as it might appear if generated by the aforementioned mapping function of provided by the sonar mapping system 200.

Additionally, the control processor 208 is configured to store these newly created or updated charts 100 in memory for later recall by the user. During each successive use of this chart 100, additional topographical data 104, for instance from an area of the body of water 101 not previously charted, can be added. Furthermore, the topographical data 104, which may include underwater features 110 (shown in FIG. 3) such as vegetation 116, sunken vessels or other natural and manmade structures gathered during previous charting sessions, can be updated to reflect any changes in the topography of the lake bed, river bed, or sea bed, as the case may be.

In certain embodiments, the chart 100 may include topographical data 104 of the lakebed, seabed, or riverbed of the body of water 101 being navigated, along with underwater features 110 (shown in FIG. 3) such as the aforementioned vegetation 116, sunken vessels or other natural and manmade structures. In such a case, the automatic charting feature of the sonar mapping system 200 (shown in FIG. 4)

is configured to update the topographical data 104 in real time. However, it is envisioned that the automatic charting feature would be able to create from scratch a topographical map in real time for the floor of the body of water 101, for example using GPS coordinates, even when there is no available topographical data 104 in memory, or even if there is no chart 100 for the body of water 101 in memory before the automatic charting feature is engaged. Topographical data 104 stored in memory may be displayed simultaneously, for example overlaid, with sonar imaging data gathered in real time by the sonar mapping system 200.

Figure 3:
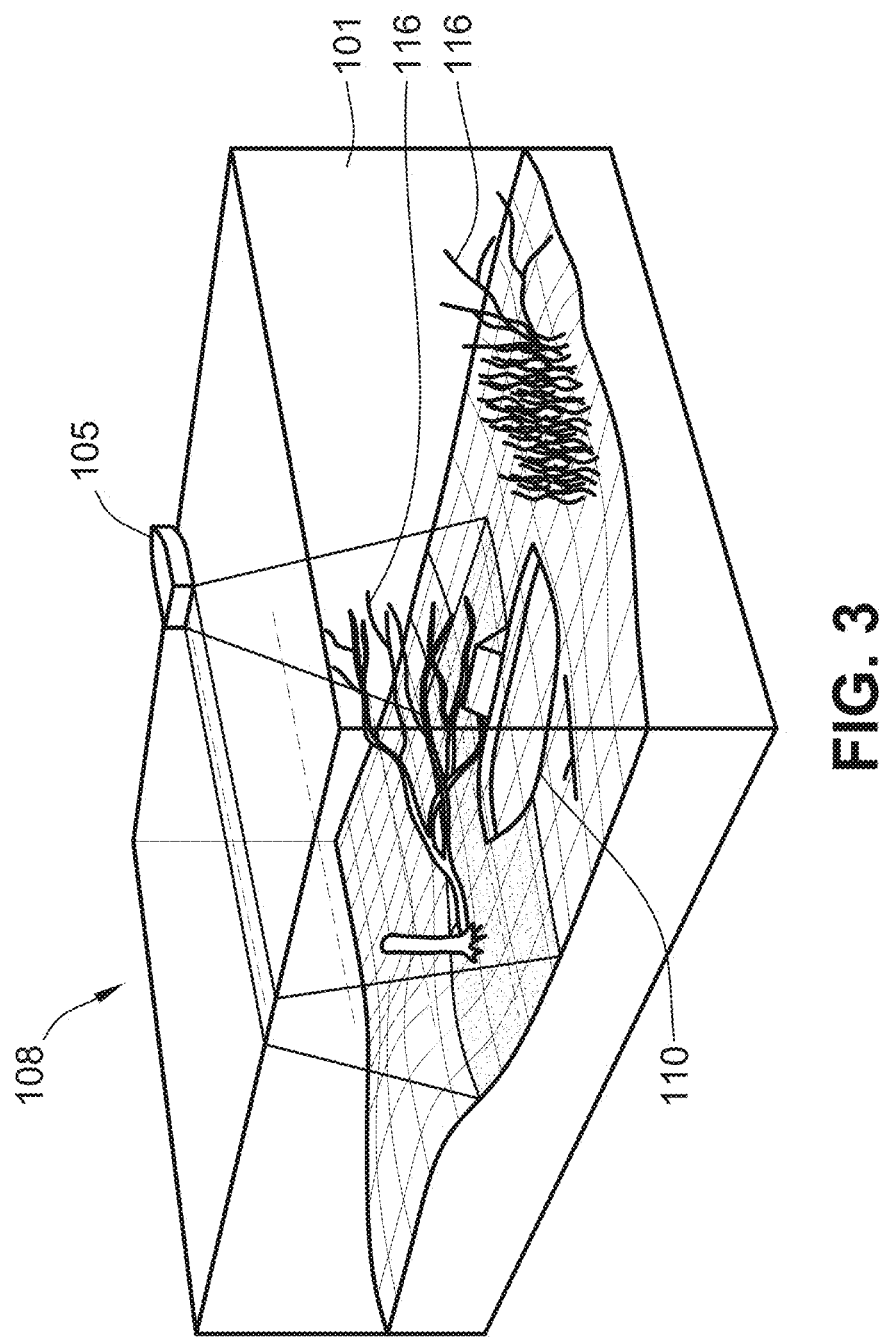
FIG. 3 is an exemplary 3-D rendering of an underwater topographical chart, according to an embodiment of the invention.

The topographical data 104 may be in the form of a bathymetric chart with contour lines 106 or underwater feature contours 115, where each contour line 106 indicates the location of a particular water depth for the body of water 101, and each underwater feature contour 115 indicates a perimeter or other point of interface with the underwater feature 110 (shown in FIG. 3). Alternatively, the topographical data 104 may be in the form of a bathymetric tints or shading to indicate various depths in the body of water 101, where the color of the tints change as the underwater topography progresses from shallow to deep. Certain bathymetric tints or shading may also be used to indicate the presence of the underwater features 110, i.e., vegetation 116 (shown in FIG. 3) or other structures on the lakebed, riverbed, or seabed. The display may be configured to show the bathymetric chart with tints in various colors which are selectable by the user on the graphical user interface 102. Similarly, it is envisioned that the contour lines 106 or underwater feature contours 115 may be customized via the graphical user interface 102 such that the contour lines 106 or underwater feature contours 115 shown on the chart 100 indicate the desired topographical feature selected by the user.

In particular embodiments, the control processor 208 (shown in FIG. 4) is also configured to use GPS data to show, on the display, the position of the boat 105 on the chart 100 for the body of water 101 being navigated, in relation to established landmarks or in relation to the boundaries of the body of water 101.

As stated above, if the chart 100 for the body of water 101 being navigated does not include topographical data 104, the sonar mapping system 200 (shown in FIG. 4) can create a topographical chart of the lakebed, riverbed, or seabed being navigated. With the automatic charting feature engaged, the sonar data for a portion of the lakebed, riverbed, or seabed is converted into topographical data by the processor. With a sufficient number of passes on the body of water 101, the entire floor of the body of water 101 can be charted. With each pass, the control processor 208 (shown in FIG. 2) performs a real-time update of the chart for the body of water 101 by adding contour lines 106, underwater features 110, numerical displays, and possibly bathymetric tints/shading to show water depths and underwater features 110 (shown in FIG. 3) on the chart being displayed.

Figure 2:
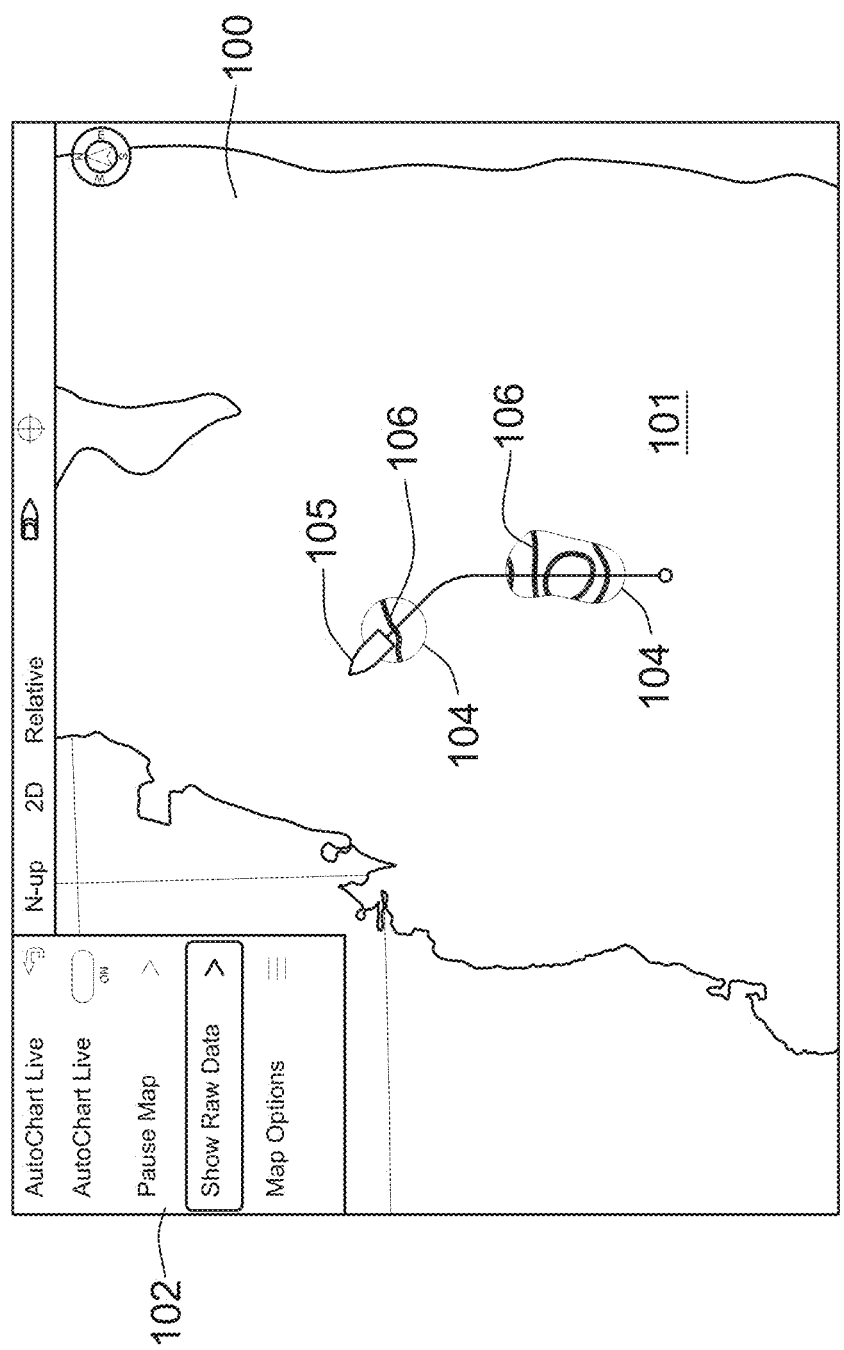
FIG. 2 is an exemplary screenshot of the display for the sonar mapping system, in accordance with an embodiment of the invention.

FIG. 2 shows topographical data 104 in two different spots along the path of travel for the boat 105. This may happen when the automatic charting function is paused for one reason or another. However, if the space between the charted areas is not too great, the control processor 208 may perform an interpolation function to estimate the missing topography, including the underwater features 110 (shown in FIG. 3), between the two charted areas. In this manner, the topographical data 104 of FIG. 2 may be rendered as a closed approximation of the actual topographical data 104 as shown in FIG. 1 for example.

This same method may be employed to map the hardness, rather than the topography of the lakebed, riverbed, or seabed. Based on the strength of the sonar signal received by the sonar transducer assembly, the control processor 208 can create a chart, a color-coded chart for example, where the colors (i.e., bathymetric tints/shading) represent a spectrum of hardness for the lakebed, riverbed, or seabed surface. It is envisioned that, in certain embodiments, the graphical user interface 102 will allow the user to select the colors for this function.

As explained above, in many cases, the lakebed, riverbed, or seabed surface is covered by varying degrees of vegetation 116 (shown in FIG. 3). In particular embodiments, the control processor 208 (shown in FIG. 4) is configured to process the signals from the sonar transducer assembly such that vegetation 116 on the lakebed, riverbed, or seabed surface can be distinguished from the lakebed, riverbed, or seabed surface itself, and distinguished from fish or other animals in the water. The control processor 208 is further configured to display the vegetation 116 on the chart 100. Furthermore, in particular embodiments, the control processor 208 is configured to show relative densities of vegetation 116 on the lakebed, riverbed, or seabed surface. The vegetation 116 may be shown in bathymetric tints (in one or more colors) so the color of the vegetation 116, as displayed for the user, is distinct from the color of the bottom surface for the body of water. The display may be a 2-D display or a 3-D rendering shown on the display screen of the user's electronic device. In certain embodiments, the user is able to choose the one or more colors of the vegetation 116 as shown on the user's display.

It is envisioned that the control processor 208 (shown in FIG. 4) can be configured to show both the vegetation 116 on the lakebed, riverbed, or seabed surface, as well as other underwater features 110 (shown in FIG. 3), while also indicating the hardness of that surface using various means, bathymetric tints being only one such mean. Color intensity or special symbols may also be used to distinguish between degrees of surface hardness. Similar means may also be used to distinguish between different types of vegetation 116.

Further, embodiments of the invention are able to generate and display a 3-D topographical map 108 of a body of water in real time based on the sonar data collected by the sonar transducer. FIG. 3 shows an exemplary rendering of the 3-D topographical map 108 along with the position of the boat 105. With the appropriate sonar transducer assembly, particular embodiments of the invention provide the user with the ability to create or update the 3-D topographical map 108 on the display and to save the created or updated 3-D topographical map 108 to memory. As in the previously-discussed embodiments, the graphical user interface 102 may be configured to allow the user to select the colors for the 3-D topographical map 108.

On the surface under the body of water 101, FIG. 3 shows the underwater feature 110 as a sunken ship. However, it is envisioned that the underwater feature 110 may comprise any number of natural or manmade structures such as weed and/or vegetation beds 116, and/or sandbars, shoals, reefs, varying degrees of bottom surface hardness 116, boats, ships, cargo, containers, etc. In this case, bottom surface typically means the lakebed, riverbed, or seabed under the user's boat 105.

In particular embodiments, the control processor 208 (shown in FIG. 4) and the graphical user interface 102 are configured such that the user of the sonar mapping system 200 (shown in FIG. 4) can adjust the display in a variety of ways including, but not limited to transparency level, color, sensitivity, contrast, etc. In a particular embodiment of the invention, the user can select from one of several drawing modes where the sonar data from the sonar transducer assembly overwrites the original chart data, overwrites previously-acquired sonar data, or is blended with original or previously-acquired sonar data. The control processor 208 may also include a feature in which sonar data with greater intensity replaces sonar data with lower intensity.

Embodiments of the present invention provide methods, devices, and systems for selecting from one of a plurality of depth or underwater feature contour lines for a body of water from a digital or raster map of the body of water that includes the above-described underwater features 110 and/or depth contours 106. The underwater features 110 and depth contour lines 106 are converted into machine-readable code which can be used by a vessel control device, such as a trolling motor control device with autopilot features, to navigate a marine vessel along the perimeter of an underwater feature 110, for example, or along a selected contour 106. As an example, ProMap Technologies, Inc., d/b/a LakeMaster®, has developed a Chart Library Application Programming Interface (API) that allows navigation system manufacturers to embed the API into their OS and thus make LakeMaster topographical maps, proprietary to LakeMaster, accessible from the navigation system unit. This navigation system unit can be connected to an autopiloting device in such a way that the operator can direct the autopiloting device to use the depth contour information from the LakeMaster maps to guide the marine vessel along a selected route around and underwater feature 110, such as vegetation 116, or along one of the selected depth contours 106. Of course, there can be other variations, modifications, and alternatives.

Modern cartography for waterways typically includes 3D data such as latitude, longitude and depth. Some sonar depth finders, or fish finders, may include algorithms that are used in the cartography software to create contiguous lines to represent certain depths or to represent the locations of sizeable underwater features 110, such as weed and/or vegetation beds 116 and/or sandbars, reefs, shoals, varying degrees of bottom surface hardness 116, or other natural and manmade structures. These features may then be visibly superimposed upon the displayed maps to give the user an idea of how a certain depth contour traverses the bottom of the waterway or how certain underwater features 110 are located in the body of water. In certain embodiments of the invention, interaction between the cartography and the fish finder software allows for the user to move the cursor above or near a contour line in a way that the contour line can be identified and selected. In other embodiments, the fish finder software allows for the user to identify the perimeter of the underwater feature 110 or a course along the edge of such a feature, for example a field of seaweed or kelp and/or vegetation beds and/or sandbars, shoals, reefs, or varying degrees of bottom surface hardness 116. Once selected, the fish finder can work with the available cartography data to determine, and display on the screen, a string of latitudinal and longitudinal coordinates, also referred to as track points, that correspond to the user's desired course.

Further, as will be explained more fully below, this string of track points can be transferred to a device to control boat position, such as a controller for a trolling motor. Controlled in this manner, the trolling motor can automatically navigate sequentially from track point to track point. As part of selecting the underwater feature 110 or contour line 106 to follow, the user may also be prompted to select the initial direction for the boat 105 to follow. This string of track points could be sent to the device for controlling the trolling motor as segments of the underwater feature 110 or contour line 106 or on an as-needed basis.

The fish finder could also determine the bearing required to navigate from point to point and send this target bearing to the device for controlling the trolling motor which in turn would steer the boat on this target heading.

In particular embodiments, the systems that are described herein are capable of controlling the path of a moving vessel to keep the vessel over a desired water depth, or along a designated underwater feature contour. Components of such a system may include, but are not limited to: a means of watercraft propulsion, a GPS receiver with GPS based cartography, a compass to detect the heading of the vessel and/or the propulsion device and a graphical user interface with a keypad or buttons.

To assist the reader in understanding the following description, the following definitions have been provided.

"API" means application programming interface.

"Chart Library" means a collection of subroutines and/or routines that contain code, images and data to provide services to independent programs.

"Contour Line" means one or more lines depicting a contiguous or semi-contiguous area of the bottom of a body of water, where the lines represent a portion of the bottom surface at the same depth below the surface of the water, or one or more lines depicting a transition between two differing areas of bottom composition, bottom hardness, weed and/or vegetation growth or current flow. "A contour line (also isoline or isarithm) of a function of two variables is a curve along which the function has a constant value."

"GPS" means Global Positioning Sensor capable of providing a visual representation of geographic location coupled with a map of the surrounding area "GPS/Sonar Combination Unit" (Combo Unit) means one or more configurations of visual displays capable of displaying inputs from GPS and Sonar units on a single integrated display.

"Navigation System Display Device" means a visual display device in one or more configurations of Navigation System or Combination Unit.

"Map Media Cards" means any form of electronic media mass storage device or media card capable of storing digital information and allowing access to such information by a digital processor.

"Human Interface" means any method by which a human user is able to input specific values (data) into a Navigation System Display Device to dynamically change the appearance of the visual display in a predetermined manner.

"Shaded" means cross-hatch, dotted, or other fill methods for regions and any and all forms of line or shading depiction.

"Raster" and "Vector" relate to techniques of processing data for display on the navigation system, or in any GIS environment. As an example, raster format basically stores a set of images that are "pinned" to a geographic location on the earth. When the GPS location data is input into the navigation system software, the image is called up and displayed on the screen. Vector format has discrete points individually coded with geographic location information. That information is output to a program which literally draws the geographic image and then places it on a screen.

"Vessel Control Device or Auto Pilot" means any form of vessel navigation control device capable of receiving and executing machine code instructions from a GPS Processor, Combo Unit Processor or computer central processor.

"Visual Display Device" means a computer screen, liquid crystal display or other means of electronically viewing images.

Figure 4:
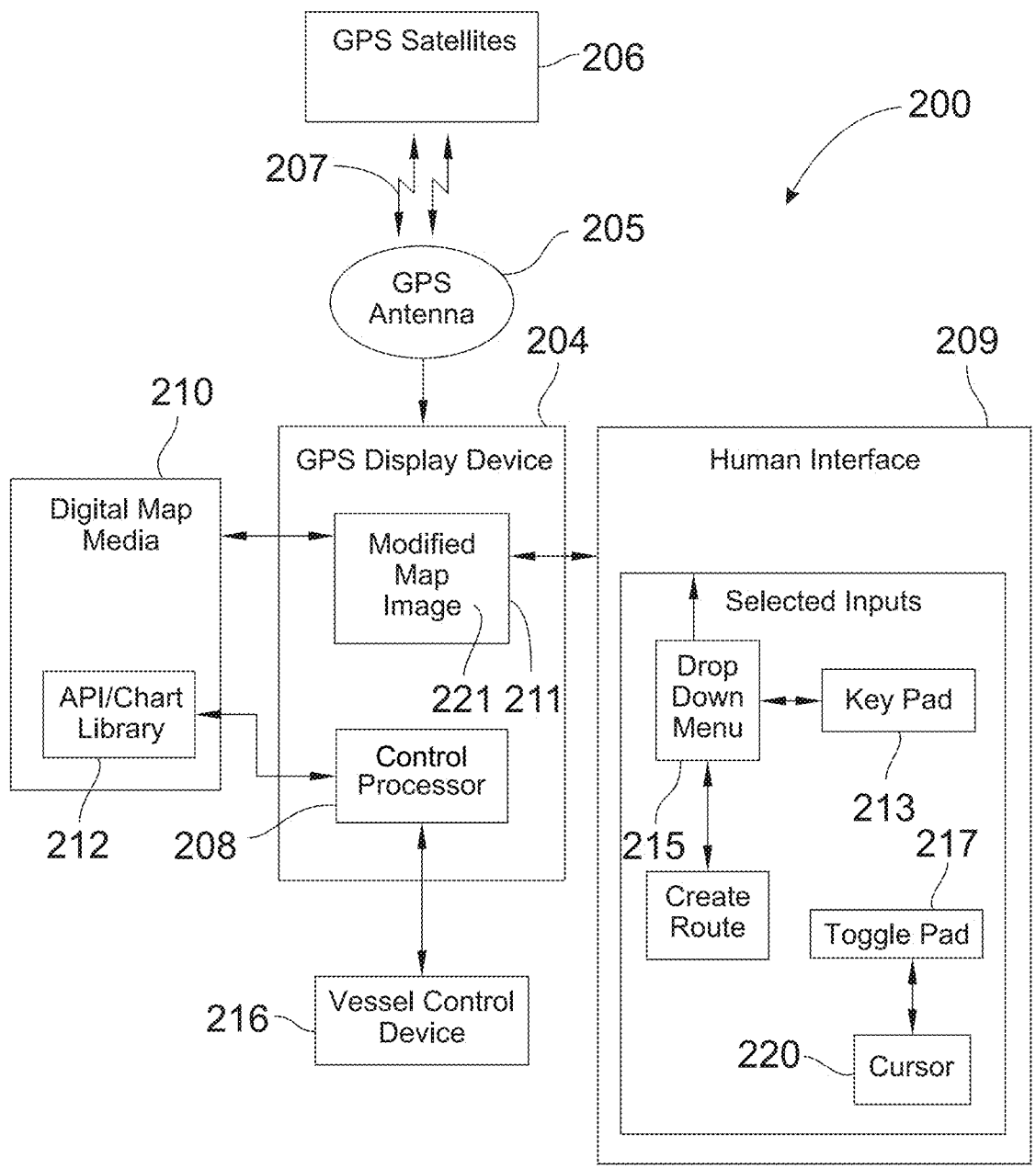
FIG. 4 is a simplified block diagram of a sonar mapping system, according to an embodiment of the present invention.

FIG. 4 is a simplified block diagram of the sonar mapping system 200, according to an embodiment of the present invention. The control processor 208 repetitively processes the signals 207 from one or more GPS satellites 206 that are received through a GPS antenna 205 to determine the position of the boat 105 (shown in FIGS. 1-3). In a certain embodiment, the control processor 208 uses this position information determines the correct visual map image to retrieve from an API/Chart Library 212 on a digital map media card 210 to display in the visual display area 211. That is, the control processor 208 associates the position information, which has coordinates, and relates such information to a certain visual map image in digital form from a plurality of map images in at least one embodiment. As an example, control processor 208 may be a graphics controller or preprogrammed micro-processor, but is not limited to these exemplary devices. In a specific embodiment, the term "processor" is used broadly to include hardware, firmware, and software embodiments, among combinations, and the like.

In particular embodiments, the control processor 208 is incorporated into the aforementioned sonar depth finder/fish finder. In an embodiment of the invention, the control processor 208 then retrieves any user pre-sets inputted through a human interface 209 to modify the map image retrieved from the map media card 210 to create a modified map image 221 from the original map image. In particular embodiments, the human interface 209 is incorporated into the aforementioned sonar depth finder/fish finder. The control processor 208 then places the modified map image 221 in the visual display area 211. The user then highlights a specific depth contour 106 or underwater feature contour 115 in order to create a route.

Still referring to FIG. 4, in particular embodiments of the invention, the user employs the human interface 209 to input location or other data for a particular underwater feature 110, or a specific depth value, e.g., 18 feet, to the control processor 208 using a specific input from a keypad 213 or a toggle pad 217 to position the cursor 220 on the depth contour 106 or underwater feature contour 115 the user wishes the boat 105 to follow. In an embodiment, the user then uses the drop down menu 215 to indicate the control processor 208 is to create a route. The control processor 208 modifies the embedded codes in the visual image previously retrieved from the Chart Library 212.

FIGS. 5-8 are diagrams illustrating a method for highlighting a depth contour 106 or underwater feature contour 115 for an underwater feature 110, and a method for setting a desired route for the boat 105 to follow, according to an embodiment of the invention. The underwater feature contour 115, typically depicted as a straight, curved, or somewhat circular line on the navigation system display 204, may represent an edge or perimeter of the underwater feature 110. Like the depth contour 106, the underwater feature contour 115, or some portion thereof, may be selected by the user to generate a route for a vessel control device 216, which automatically directs the boat 105 to follow the generated route. The vessel control device 216 is described in more detail below.

Figure 5:
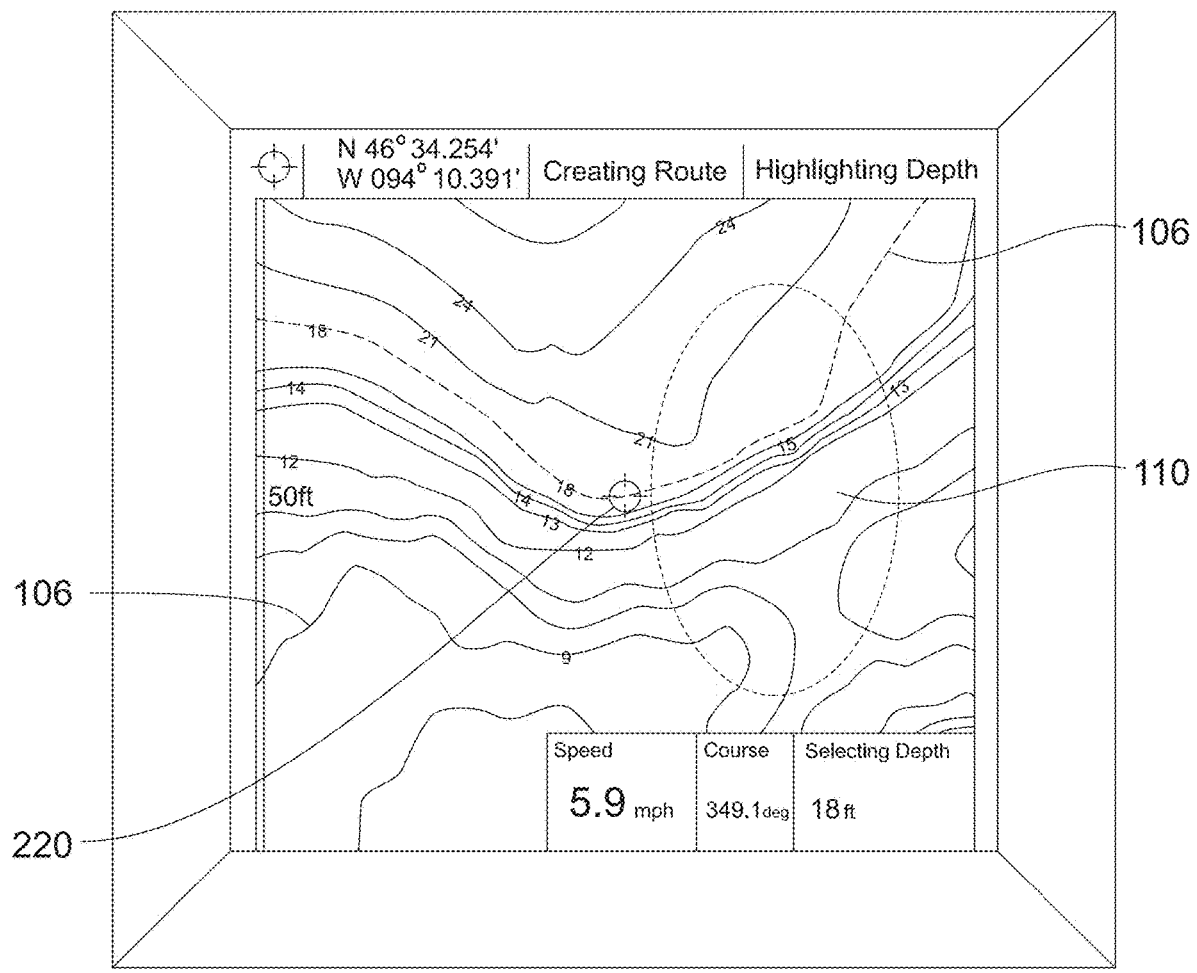
FIG. 5 is a simplified diagram illustrating a method for highlighting a charted depth, according to an embodiment of the present invention.
Figure 6:
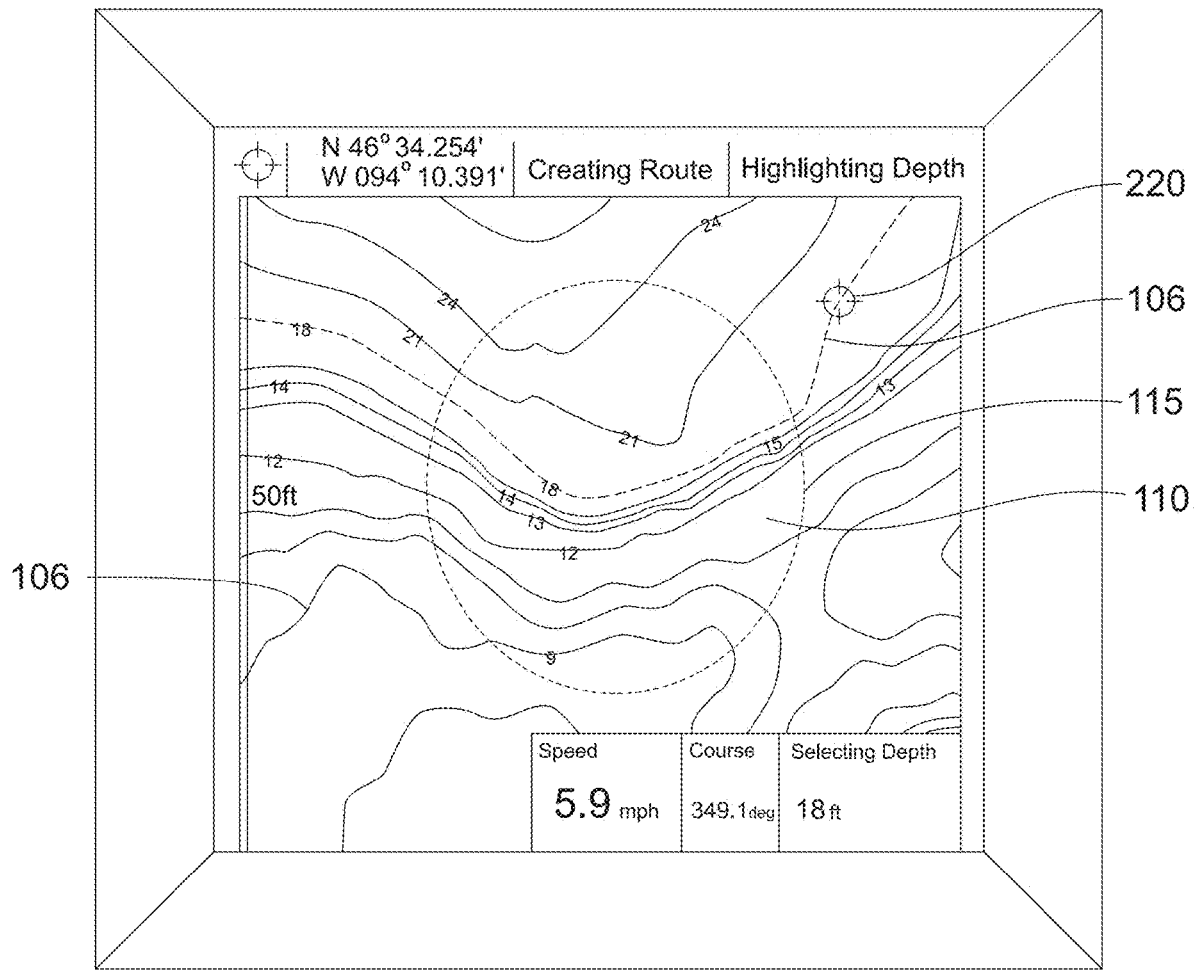
FIG. 6 is a simplified diagram illustrating a method to set a route starting point, according to an embodiment of the present invention.
Figure 7:
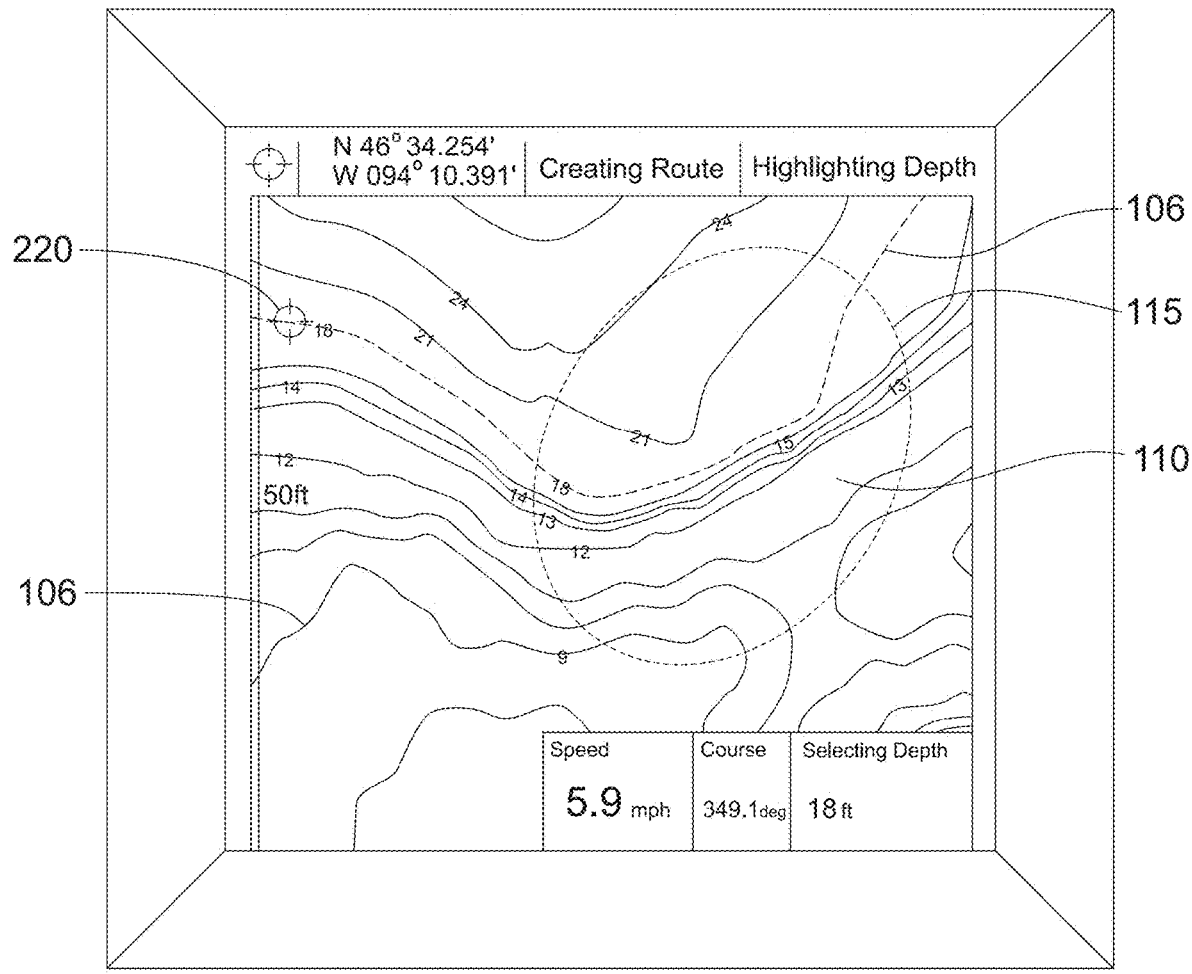
FIG. 7 is a simplified diagram illustrating a method to set a route ending point, according to an embodiment of the present invention.
Figure 8:
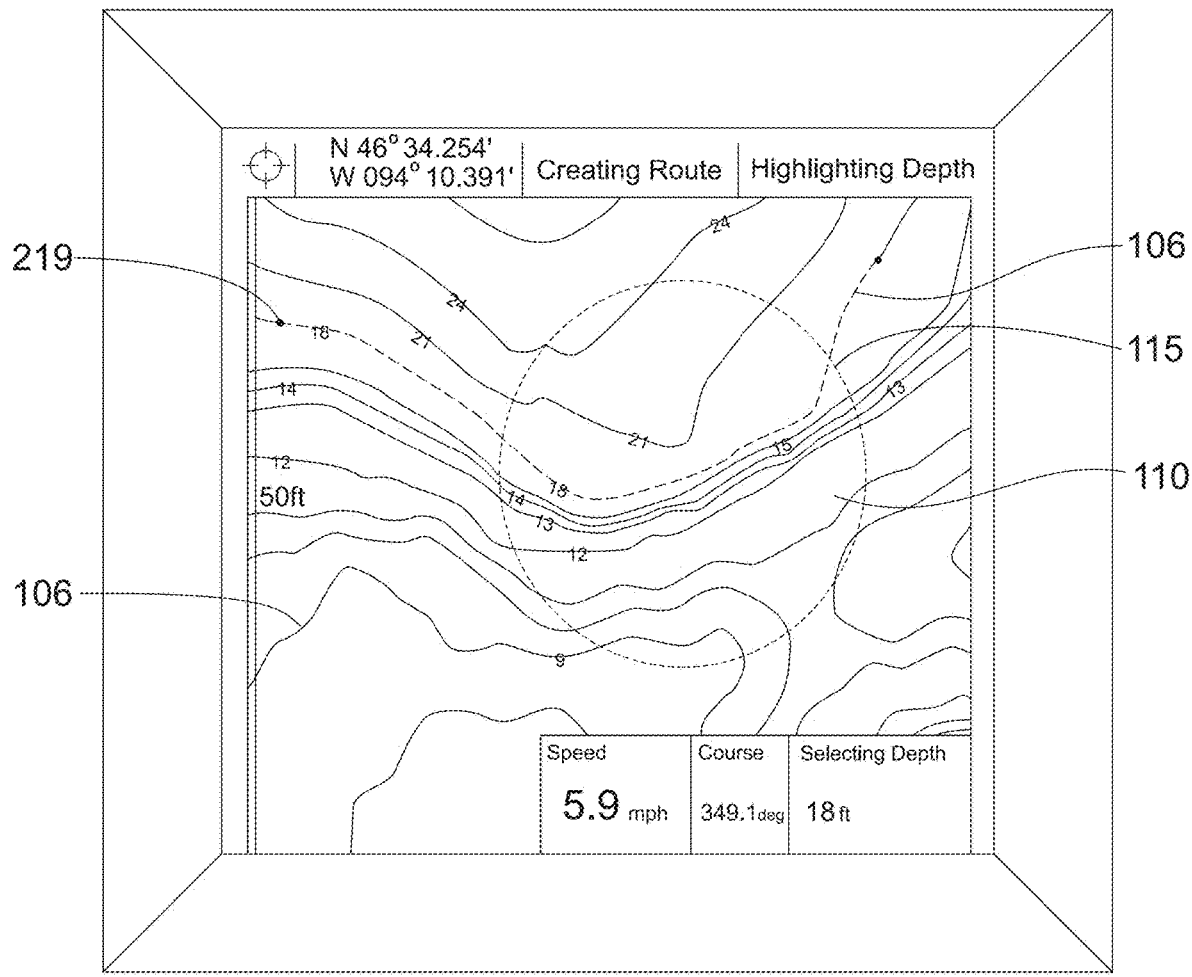
FIG. 8 is a simplified diagram illustrating a method for a route set, and a process for preparing machine instructions, according to an embodiment of the present invention.

In the example of FIG. 5, the modified code causes the control processor 208 to highlight the specified 18-foot depth contour line 106 by changing the graphic representation of the 18-foot contour line 106, or to highlight the specified underwater feature contour 115 by changing the graphic representation of the underwater feature contour 115. The control processor 208 then places the modified map image 221 showing the specific highlighted contour 106 in the visual display area 211.

The user then determines whether to use the entire depth contour 106, underwater feature contour 115 or some part thereof. To use only a part of the contour 106, 115, the user uses the human interface 209 (shown in FIG. 4) to move the cursor 220 over the starting point of the route to be created and uses the key pad 213 to "lock in" the start position. The user then moves the cursor 220 to the stop point of the route on the selected contour and uses the key pad to "lock in" the stop point of the route to be created. The control processor 208 then retrieves the appropriate code from the designated section of the depth contour 106 or underwater feature contour 115 and converts that code to a machine-readable set of instructions. These instructions are then retained by the control processor 208 (shown in FIG. 4) and made available to the vessel control device 216, which may include a trolling motor with autopilot features for example. Of course, the visual display area 211 can alternatively display the modified map image 221 for any location the user may choose. This allows the user to create specific routes in areas away from the boat's current position. The user could also indicate the direction of travel. The system would then navigate the boat 105 along the designated depth contour 106 or underwater feature contour 115.

In an alternate embodiment, after the user inputs a specific depth value or particular underwater feature characteristic, or pinpoints a specific contour of an underwater feature 110, and a desired direction of travel through the user interface 209 (shown in FIG. 4), the control processor 208 (shown in FIG. 4) would search the map information and, based on the current position of the boat 105, it would attempt to create a route in the approximate heading that will keep the boat 105 at or near the desired depth or designated underwater feature 110. Some bodies of water 101 have bottom areas that stay at a similar depth across a wide area perpendicular to the desired direction of travel. In particular embodiments, the control processor 208 causes the vessel control device 216 to pick a route along a boundary or of an underwater feature 110, or near the center of this wide tract of bottom area with a similar depth.

The control processor 208 can be programmed to process the chart data in one of several different ways. In one instance, the depth or underwater feature information is formatted as a two-dimensional array of cells centered at a specific latitude and longitude. In this array of cells, there is a predetermined distance between each cell, for example in meters or some other linear unit of measurement. Each cell contains depth information which corresponds to the location at the center of that cell.

Using a depth chart in this fashion is similar to requesting a chart image to be drawn in an image buffer. The depth or underwater feature information is available for an entire region without having to request more data from the depth data provider. As an example, the coloring of a location over water on marine charts may be based on the water depth, vegetation, or underwater feature 110 at that location. Therefore, returning an entire depth chart with three-dimensional data may not require much more processing power than rendering the two-dimensional chart.

In a second instance, in which the control processor 208 does not have a large amount of memory to act as a buffer for depth or underwater feature information, the control processor 208 can determine the track it should follow by repeatedly requesting depth or underwater feature information at individual locations. For example, using the vessel's current position and its immediate heading, the control processor 208 can search ahead of the current track to see when the contour line 106, 115 it is following changes direction. When the contour line 106, 115 changes direction, the control processor 208 can determine how the vessel's course should be changed so that the contour line 106, 115 is still followed, and send the appropriate commands to the vessel control device 216.

While making a sequence of direct function calls in this manner might use more processor power than the depth chart method, it does not require the considerable storage capacity needed for a depth chart. In this scenario, the control processor 208 essentially feels its way around the contour line 106, 115 via repeated depth or underwater feature inquiries without having to compute and store a lot of depth or underwater feature values that will not be used.

An alternate embodiment includes a method in which the user indicates a certain depth contour line 106 or underwater feature contour 115 on the chart being displayed on the navigation system display 204. The user could also indicate the direction of travel. The user would also input a depth value or underwater feature characteristic which will be used as a depth offset from the selected depth contour line 106 or underwater feature contour 115. The system would create a route that follows the desired depth (contour line+/−depth offset) or underwater feature contour 115, and attempts to stay parallel to the selected contour line 106, 115.

Another embodiment includes a method in which the user indicates two adjacent depth contour lines 106 or two adjacent underwater feature contours 115 on the chart being displayed on the navigation system display 204. The user could also indicate a desired direction of travel. The system would navigate the boat 105 along a course that lies between the two depth contour lines 106, or between the two adjacent underwater feature contours 115. The system could navigate a course close to the center point between these two contour lines 106, 115 or could navigate a course designated by the user anywhere between the selected contour lines 106, 115.

Yet another embodiment includes a method in which the user indicates a certain depth contour line 106 or underwater feature contours 115 on the map being displayed on the navigation system display 204. The user could also indicate the direction of travel. In this embodiment, the user would also input a value of lateral shift the course should have from the selected contour line 106 or underwater feature contour 115. This would be especially helpful for users that want to follow the shoreline, for example, but at a predetermined distance.

FIG. 9 illustrates how such a lateral shift would work. FIG. 9 is a diagram of a track 230, which may be a depth contour line 106 or and underwater feature contour 115, along with a laterally-shifted contour line 232, in accordance with an embodiment of the invention. In the embodiment of the invention, the user would indicate to which side of the original track 230 they want to navigate and how far away from the original track 30 the laterally-shifted track 232 is to be. In FIG. 9, the laterally-shifted track 232 is offset 10 feet from original track 230. However, the offset selected by the user could be greater or lesser than 10 feet. In a particular embodiment, the fish finder software would create the new set of track points that make up the laterally-shifted track 232 from the continuous tangencies of the original track 230.

Another method would involve the user simply marking two points on the map that have the same or similar depth. In a particular embodiment, the fish finder software in conjunction with the 3D cartography creates a track that goes between these two markers that also follows the desired depth or designated underwater feature 110. The fish finder is also able to extend the track beyond the two markers while still following the desired depth or designated underwater feature 110. This track data can then be used by the vessel control device 216, for example with a trolling motor for navigation. In some cases, the fish finder software would employ an algorithm to create a best fit line for situations where the bottom contour is flat.

Still another embodiment includes a method in which the user identifies segments of displayed depth contour lines 106 that aren't necessarily indicating the same depth, or different underwater feature contours 115. The system would allow the user a way to dictate how these selected segments would get strung together. This method would also include a way for the user add in any track points between track segments that are needed or desired to show the desired route to travel between these segments of depth contour lines 106 or underwater feature contours 115.

In a specific embodiment, the present invention provides a method for selecting lake depth contour lines 106 or underwater feature contours 115 for a body of water from a digital or raster map of lake depth or designated underwater feature contours 115 displayed on a navigation system display 204 or other display device and converting them to a machine-readable code to allow the vessel control device 216 to navigate the boat 105 along the selected contour(s). In certain embodiments, the vessel control device 216 is a trolling motor control device having autopilot capabilities.

An example of specific sequence of steps carried out via programmed vessel control device 216 and navigation system display 204 is shown below in a step by step sequence, in accordance with an embodiment of the invention.

1. Provide a plurality of charts or maps from a Chart Library 212 (e.g., stored on a thumb drive, CD, memory card, flash memory, memory stick, hard memory, fixed memory, database);

2. Provide at least one chart out (e.g., vector and/or raster) of the plurality of charts with depth contour lines 106 or underwater feature contour 115 for one or more regions of a body of water 101;

3. Display the chart on a display or navigation system display 204 based on the vessel's current position or by selecting a different part of the chart away from the vessel, while navigating a vessel which is coupled to the display or navigation system display 204;

4. User selects at least one depth contour line 106 or underwater feature contour 115 to be highlighted within the chart on the display;

5. Control processor 208 evaluates the information associated with the selected depth contour line 106 or underwater feature contour 115 using specific attributes embedded within the chart display to create a course along which the vessel is to be navigated;

6. User may optionally select a starting point and an ending point on a particular depth contour line 106 or underwater feature contour 115 if only a portion of the course created is to be employed;

7. Control processor 208 converts the route generated machine-readable code within the navigation system or other device;

8. Control processor 208 outputs one or more indications associated with the one or more depth contour lines 106 or one or more underwater feature contours 115 on the display;

9. Transfer the machine-readable code to a vessel control device 216, coupled to a navigation system, which may also include a trolling motor, including rudder;

10. Engage the vessel control device to automatically navigate the vessel along the selected contour line using the course instruction code(s).

As shown, the present method includes a sequence of steps and/or processes that, among other things, allow for automated vessel navigation by way of selecting at least a portion of a depth contour line 106 or underwater feature contour 115 on a map or chart. Depending upon the embodiments, the steps shown above may be combined or separated. Additional steps may be added or certain optional steps may be removed. Alternate methods according to embodiments of the present invention are described below.

For example, an alternate method for navigating a boat 105 along a depth contour 106 or underwater feature contour 115, according to an embodiment of the invention, may be identified as follows.

1. Provide at least one chart (e.g., vector and/or raster) out of the plurality of charts for one or more regions of a body of water 101 containing intelligent pixels containing attributes discernible by raster intercept;
2. While navigating a vessel which is coupled to a display or navigation system display 204, user selects current position or selects cursor position to display a different part of the chart away from the vessel position;
3. If cursor position equals current vessel position, display raster image of current position associated with the zoom level and detail resident on the display or navigation system display 204, if not then display raster image at cursor coordinate location associated with the zoom level and detail resident on the display or navigation system display 204;
4. User inputs desired depth or underwater feature contour 115 along which to create route; (e.g. depth, bottom content, weed edge and/or vegetation bed and/or a sandbar, shoal, reef, sunken vessel, or varying degrees of hardness on a bottom surface);
5. User selects depth from drop down menu or keypad;
6. Control processor 208 evaluates intelligent pixels in current display and adds appropriate pixels to highlight memory buffer;
7. When all pixels in current display are evaluated, set color attribute of pixels in highlight memory buffer to "highlight color" and output highlight memory buffer to navigation system display;
8. User sets cursor 220 at starting point on highlighted contour;
9. Control processor 208 evaluates all pixels in highlight memory buffer to find pixel with location attribute equal to cursor location and place start pixel in course memory buffer;
10. User sets cursor 220 at ending point on highlighted depth contour 106 or underwater feature contours 115;
11. Control processor 208 evaluates all pixels in highlight contour memory buffer to find pixel with location attribute equal to cursor location and place ending point pixel in course memory buffer;
12. Control processor 208 evaluates starting and ending pixel to establish horizontal spatial bounds of course along highlighted depth contour 106 or underwater feature contours 115;
13. Control processor 208 evaluates pixels in highlight contour memory buffer and places all pixels within horizontal course spatial boundaries in the course memory buffer;
14. Control processor 208 evaluates all pixels in the course memory buffer to place them in spatially ordered sequence from start pixel to end pixel;
15. Control processor 208 evaluates the azimuth between each pixel sequentially in course memory buffer to determine if azimuth changes between successive pixels;
16. For each azimuth between pixels that represents a change from the previous azimuth between pixels, place the current pixel and the pixel immediately preceding the azimuth change in the vessel control buffer;
17. When control processor 208 has evaluated all azimuths between pixels in the course memory buffer, lookup vessel control device instruction format;
18. Choose correct world coordinate file and for each intelligent pixel in the course buffer, convert each intelligent pixel's location attribute to the correct world file coordinate; and
19. Engage the vessel control device 216 to navigate the boat 105 along the selected contour line 106 or underwater feature contour 115 using the converted world coordinate file.

In embodiments of the invention, the API is provided with the ability to convert contour line information into machine-readable code for autopilot-enabled devices that may be used on fishing and boating vessels, for example. This functionality is provided to the API and is thus applicable to devices that can access the API. The mapping display function of the API is more particularly described below.

The function and graphic primitives that allow this function to be performed on a navigation system display 204 are resident in one or more codes. Typically, the navigation system manufacturer (in this case, as an example, Humminbird) provides the Operating System Menu Options that allow this function to be invoked through a drop down menu 215, thus allowing the user to select all or part of a particular contour line 106, 115 or combination of different contour lines 106, 115 for conversion to machine-readable codes accessible by the vessel control device 216 with autopilot features. The selection is accomplished, for example, by inputting a desired depth or desired underwater feature characteristic through a screen slide bar, keypad 213, toggle switch 217, or like data entry method.

When a specific contour line 106, 115 is selected and highlighted, the API extracts an attributed image of the selected contour line 106, 115 from the map contained in a Chart Library 212, which contains various topographical maps for different bodies of water 101. In a specific embodiment, the chart comprises at least information selected from a hardness of the bottom of the body of water 101, a content of the bottom of the body of water 101, a weed content of the body of water 101, or a flow current for the body of water 101. The depth contour line 106 or underwater feature contour 115 is a series of GPS or spatial coordinates that represent a specific depth. The API then uses the attributed image to create a series of machine-readable coordinates, for example GPS coordinates, which can be accessed and utilized by the vessel control device 216. Any contour line 106, 115 displayed by the navigation system display 204 can be selected for conversion to machine-readable coordinates by the API.

In a specific embodiment, the chart being displayed includes at least one indication. Specifically, one or more indications are associated with one or more broken contour lines, one or more underwater feature contours 115, one or more flashing depth contour lines 106, one or more series of symbols, or other visual indications for a display. In a specific embodiment, the one or more indications are associated with one or more contour lines 106 differentiated from the remaining depth contour lines 106, one or more underwater feature contours 115 differentiated from the remaining underwater feature contours 115, or wherein the one or more indications are associated with one or more shaded regions differentiated from the remaining regions, or wherein the one or more indications are associated with one or more colored regions differentiated from the remaining regions.

In a specific embodiment, the present system and method allow for the creation and export of tracking routes from a complex intelligent image or vector database formed from a variety of inputs. Further details of aspects of the invention are provided throughout the present specification and more particularly below.

In a specific embodiment, a tracking route 219 (see FIG. 8) is a sequenced set of coordinates suitably spaced with a starting and end point and in the proper format and geographic projection for directional use with an intelligent electronic trolling motor or other vessel control device. The system and method generate these routes 219 by tracking edges from the intelligent image or from line segments of the vector database.

In a specific embodiment, an edge is a linear sequence of image points of constant value and along which the values on opposite sides of the line are different. For example, in a simple lake topographical map the contour lines 106 or underwater feature contours 115 represent edges defining boundaries of an underwater feature 110 or edges along which the lake depth is constant and changes from one side of the contour line 106, 115 to the other. The images from which these edges are derived may be simple depth images with various underwater features or complex images derived from a variety of sources.

In a specific embodiment, a line segment of the vector database consists of points of constant value and along which the values on opposite sides of the line segment are different. For example, in a simple lake topographical map the depth contour lines 106 or underwater feature contours 115 represent line segments defining boundaries or portions thereof for an underwater feature 110, or segments along which the lake depth is constant and changes from one side of the contour to the other. The vector database from which these line segments are derived may be simple depth points with various underwater features or complex lines derived from a variety of sources, which are examples. Such sources include:

1. Intelligent-image-based depth contour maps in which depth information is encoded directly into the image;
2. Auto-correcting vector-based contours in which the depth or underwater feature information is encoded into sequenced points which are automatically corrected for changes in lake levels based on user-selected offset values;
3. Water clarity and substrate data for a body of water representing the type of bottom surface (rock, sand, mud) and/or hardness and the presence of weed beds or other vegetation, reefs, shoals, sandbars;
4. Date, time, and user-provided weather data (wind speed and cloud cover).

In at least one embodiment, these images or vector line segments are generated based on combinations of the above data from user input and may simply represent data for depth, an underwater feature, or combined data such as depth and light intensity or depth and underwater features such as vegetation, reefs, shoals, sandbars, sunken vessels, etc. In this embodiment, the user may then select a start and end point for the route generation and the system tracks the desired edge and displays the track on the screen for user verification. The user can then direct the system to transfer the tracking route 19 to the vessel control device 216 by converting the image or line segment coordinates to the world coordinates and format required by the vessel control device 216.

FIG. 10 shows a diagram of the boat 105 with a bow-mounted electric trolling motor 234. In this embodiment, the trolling motor 234 is connected to a vessel control device 216 in the form of a trolling motor controller 236. The trolling motor controller 236 includes the following: GPS receiver, electric steering motor for rotating the trolling motor, compass that is mounted such that its feedback corresponds to the direction the motor is pointing, RF section used to communicate with a wireless remote control 240, and an additional communications section used for communication with a sonar depth finder/fish finder 238 (could be RF or hard-wired such as Ethernet).

The sonar depth finder/fish finder 38, which in this embodiment is mounted to the operator's console 239, includes a GPS receiver the navigation system display 204, and may include memory for storage of charts and maps with depth contour lines 106 and underwater feature contours 115. Further, the sonar depth finder/fish finder 238 may be configured to carry out the methods of providing charts for a body of water with depth contour lines 106 and underwater feature contours 115, allowing the user to select a particular desired contour line 106, 115, or some portion thereof for the boat 105 to follow, and generating one or more routes for the boat 105 based on user input.

In certain embodiments, the fish finder 238 may not have enough memory to store a large number of charts for various bodies of water, but instead includes connections for portable memory devices (e.g., USB thumb drives, memory cards, optical drives) which can store maps with depth contour lines 106 and underwater feature contours 115. In some embodiments, the fish finder 238 has a cursor feature to enable the user to move the cursor 220 to allow for selecting the depth contour line 106 or underwater feature contour 115 to be followed.

In certain embodiments of the invention, the wireless remote control 240 has a user interface that includes a display screen, a keypad, and some combination of buttons or function keys. As such, elements of the human interface 209 described above may be incorporated into the wireless remote control 240. The display screen on the remote control 240 could be an LCD display, LED display, or some other suitable type of display. It is also envisioned that the display screen could be a touch-screen configured to accept input commands from the user. Such a touch screen display could allow for the elimination of function keys or buttons on the keypad. In a particular embodiment, the wireless remote control 240 is the primary user interface for controlling the trolling motor 234, whether directly controlling the trolling motor's functions or using one or a combination of built-in functions to implement automated control of the trolling motor 234. In this case, direct control means that the user could control the speed and heading of the boat 105 via real-time control of the trolling motor 234 through the wireless remote control 240.

In a particular embodiment, the wireless remote control 240 may be configured to display a smaller version of the navigation system display 204. As such, the user wouldn't necessarily have to be in front of the navigation system display 204 to identify depth contours 106, underwater feature contours 115, or track points that are stored and displayed on the navigation system display 204. This would give the user similar functionality as through the fish finder 238 for doing things like identifying depth contour lines 106 and underwater feature contours 115, and the associated track points to navigate along.

FIG. 11 shows a diagram of the boat 105 with a transom-mounted main propulsion system and transom-mounted trolling motor 244 connected to the trolling motor controller 236. As in the embodiment of FIG. 10, the sonar depth finder/fish finder 238 includes topographical maps stored in memory with various contour lines 106, 115, along with the navigation system display 204. Also, as in the embodiment of FIG. 10, the fish finder 238 includes a cursor feature to enable the user to move the cursor 220 to allow for selecting which contour line 106, 115 to follow. Further, the trolling motor controller 236 includes control mechanisms in which the rudder can be controlled automatically, and a compass which, in particular embodiments, is mounted to the boat 105 and calibrated so that the keel line of the boat 105 is known to the trolling motor controller 236. This control mechanism can then receive target headings from the fish finder 238 and be able to keep the boat 105 on the desired course until a new heading is received.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A system for controlling a marine vessel, comprising:
    a sonar mapping system having a processor configured to process sonar data provided by a sonar transducer assembly, the sonar data including information from which the processor can distinguish vegetation from a bottom of a body of water;
    wherein the sonar mapping system is configured to generate a route for the marine vessel along an edge of the vegetation from the sonar data provided by the sonar transducer assembly; and
    a vessel control device in communication with the sonar mapping system, the vessel control device configured to receive transmissions from the sonar mapping system, the transmissions including the route generated by the processor, the vessel control device being further configured to automatically direct the marine vessel along the route.

2. The system of claim 1, wherein the sonar data includes information from which the processor can distinguish varying degrees of hardness of the bottom of the body of water; and
    wherein the sonar mapping system is configured to generate a route for the marine vessel along a transition between the varying degrees of hardness of the bottom from the sonar data provided by the sonar transducer assembly.

3. The system of claim 1, wherein the sonar data includes information from which the processor can distinguish natural and manmade structures on the bottom of the body of water; and
    wherein the sonar mapping system is configured to generate a route for the marine vessel along a perimeter of the natural and manmade structures from the sonar data provided by the sonar transducer assembly.

4. The system of claim 3, wherein the natural structures include at least one of a sandbar, shoal, or reef.

5. The system of claim 3, wherein the manmade structures include a sunken vessel.

6. The system of claim 1, wherein the sonar mapping system is configured to generate the route along the edge of the vegetation in real time as the sonar data is being collected by the sonar transducer assembly to allow the processor to distinguish the vegetation from the bottom.

7. The system of claim 6, wherein the sonar mapping system further comprises a display on which the processor displays in real time the edge of the vegetation as the processor distinguishes the vegetation from the bottom of the body of water thereby creating a topographical chart representative of where the marine vessel has traveled on the body of water.

8. The system of claim 7, wherein the sonar mapping system further comprises a memory, and wherein the processor stores the topographical chart in the memory.

9. The system of claim 7, wherein the sonar mapping system superimposes a color on the topographical chart where the processor has distinguished the vegetation.

10. The system of claim 1, wherein the sonar mapping system is configured to generate the route for the marine vessel along the edge of the vegetation from the sonar data provided by the sonar transducer assembly to include an offset from the edge of the vegetation, and to generate the route with the offset for transmission to the vessel control device.

11. The system of claim 1, wherein the vessel control device is in wireless communication with the sonar mapping system.

12. The system of claim 1, wherein the sonar mapping system includes a memory in which may be stored a topographical chart for the body of water, and wherein the processor is configured to add the vegetation distinguished from the sonar data to the topographical chart.

13. The system of claim 1, wherein as the vessel control device automatically directs the marine vessel along the route, additional sonar data is provided by the sonar transducer assembly to the processor to allow the sonar mapping system to continue to generate the route along the edge of the vegetation in real time, and wherein the route generated thereby defines a perimeter of the vegetation on the bottom of the body of water.

14. A method of navigating a marine vessel along an edge of vegetation on a bottom of a body of water, comprising the steps of:
 receiving sonar data provided by a sonar transducer assembly as the marine vessel is moving across a surface of the body of water;
 identifying vegetation from the sonar data;
 generating a route corresponding to an edge of the vegetation; and
 automatically directing the marine vessel along the route corresponding to the edge of the vegetation identified from the sonar data.

15. The method of claim 14, wherein the step of generating the route corresponding to the edge of the vegetation comprises the step of generating additions to the route in real time as additional sonar data is being received during the step of receiving and as additional vegetation is being identified during the step of identifying as the marine vessel is being automatically directed along the route.

16. The method of claim 14, further comprising the steps of:
 identifying varying degrees of hardness of the bottom of the body of water from the sonar data;
 generating a second route along a transition between the varying degrees of hardness of the bottom; and
 automatically directing the marine vessel along the second route corresponding to the transition between the varying degrees of hardness of the bottom identified from the sonar data.

17. The method of claim 14, further comprising the steps of:
 identifying natural and manmade structures on the bottom of the body of water from the sonar data;
 generating a second route along a perimeter of the natural and manmade structures; and
 automatically directing the marine vessel along the second route corresponding to the perimeter of the natural and manmade structures identified from the sonar data.

18. The method of claim 14, further comprising the step of displaying in real time the edge of the vegetation during the step of identifying.

19. The method of claim 18, further comprising the step of superimposing a color where the vegetation has been identified in the step of identifying.

20. The method of claim 14, further comprising the step of creating a topographical chart in real time including the edge of the vegetation.

* * * * *

UNITED STATES PATENT AND TRADEMARK OFFICE
CERTIFICATE OF CORRECTION

PATENT NO. : 11,347,222 B2
APPLICATION NO. : 15/795013
DATED : May 31, 2022
INVENTOR(S) : Per Pelin et al.

It is certified that error appears in the above-identified patent and that said Letters Patent is hereby corrected as shown below:

In the Specification

Column 3, Line 60 reads "course, one or ordinary skill in the art would recognize other" and should read --course, one of ordinary skill in the art would recognize other--

Column 7, Line 19 reads "date for the entire route generated by the sonar depth finder" and should read --data for the entire route generated by the sonar depth finder--

Column 7, Line 22 reads "the controller is configured to store date for only a portion" and should read --the controller is configured to store data for only a portion--

Column 12, Line 34 reads "coupled with a map of the surrounding area" and should read --coupled with a map of the surrounding area.--

Column 15, Line 57 reads "from the original track 30 the laterally-shifted track 232 is to" and should read --from the original track 230 the laterally-shifted track 232 is to--

Column 20, Line 16 reads "The sonar depth finder/fish finder 38, which in this" and should read --The sonar depth finder/fish finder 238, which in this--

Signed and Sealed this
Nineteenth Day of July, 2022

Katherine Kelly Vidal
*Director of the United States Patent and Trademark Office*